(12) United States Patent
Wasily

(10) Patent No.: US 8,725,202 B2
(45) Date of Patent: May 13, 2014

(54) SINGLE TRANSCEIVER FOR WIRELESS PEER-TO-PEER CONNECTIONS

(71) Applicant: Nabil Yousef Wasily, Foothill Ranch, CA (US)

(72) Inventor: Nabil Yousef Wasily, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 0 days.

(21) Appl. No.: 13/904,694

(22) Filed: May 29, 2013

(65) Prior Publication Data

US 2013/0324186 A1 Dec. 5, 2013

Related U.S. Application Data

(60) Provisional application No. 61/652,686, filed on May 29, 2012.

(51) Int. Cl.
*H04M 1/00* (2006.01)

(52) U.S. Cl.
USPC ...... 455/552.1; 455/73; 455/550.1; 455/41.2; 455/500; 370/328; 370/338; 370/469

(58) Field of Classification Search
CPC ...... H04W 88/06; H04W 84/12; H04W 88/10

USPC ............... 455/73, 550.1, 552.1, 41.2, 500; 370/338, 328, 469

See application file for complete search history.

(56) References Cited

U.S. PATENT DOCUMENTS

| 2012/0106475 | A1* | 5/2012 | Jung | 370/329 |
| 2012/0166671 | A1* | 6/2012 | Qi et al. | 709/236 |
| 2013/0281020 | A1* | 10/2013 | Montemurro | 455/41.2 |

* cited by examiner

*Primary Examiner* — Tuan Pham
(74) *Attorney, Agent, or Firm* — Rahman LLC

(57) ABSTRACT

Data transfer in a communications network includes a first communication device including a transceiver; and an interface operatively connected to the first communication device, wherein the interface provides multiple operative connections for data transfer, wherein the multiple operative connections include a WLAN connection adapted for communication with an access point that generates data exchange signals; and a P2P connection adapted for communication with a second communication device, wherein the transceiver is shared between the multiple operative connections. The first and second communication devices may include a WiFi device. The first communication device may further include a pair of data registers and state machines; a MAC layer controller that receives input from the pair of data registers and state machines; and a PHY layer controller that receives input from the pair of data registers and state machines and the MAC layer controller, and sends instructions to the transceiver.

20 Claims, 8 Drawing Sheets

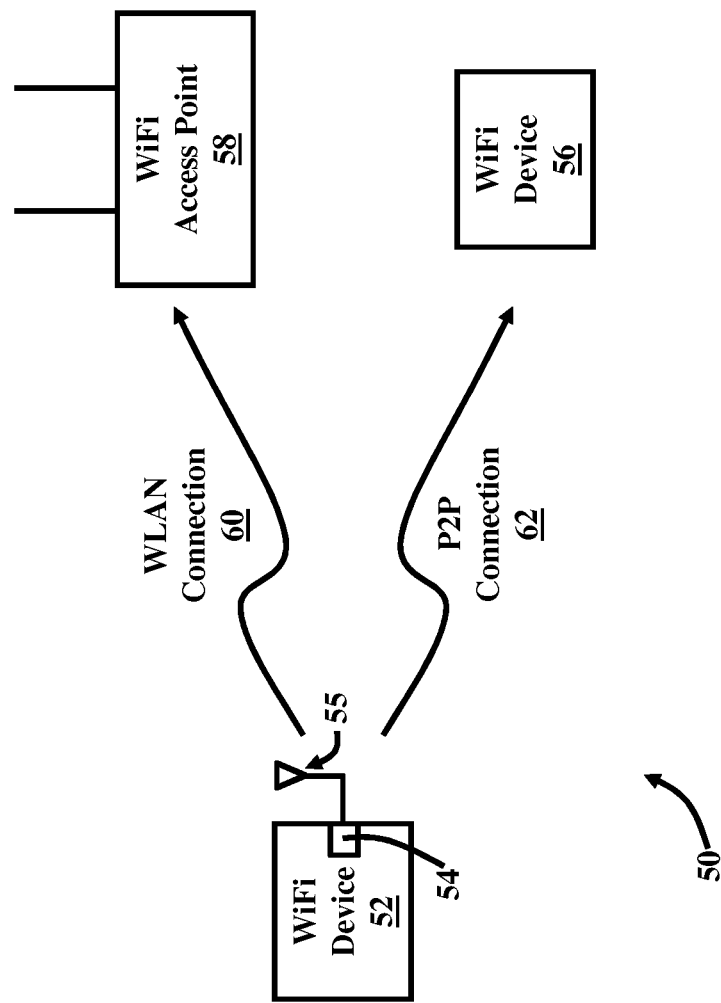

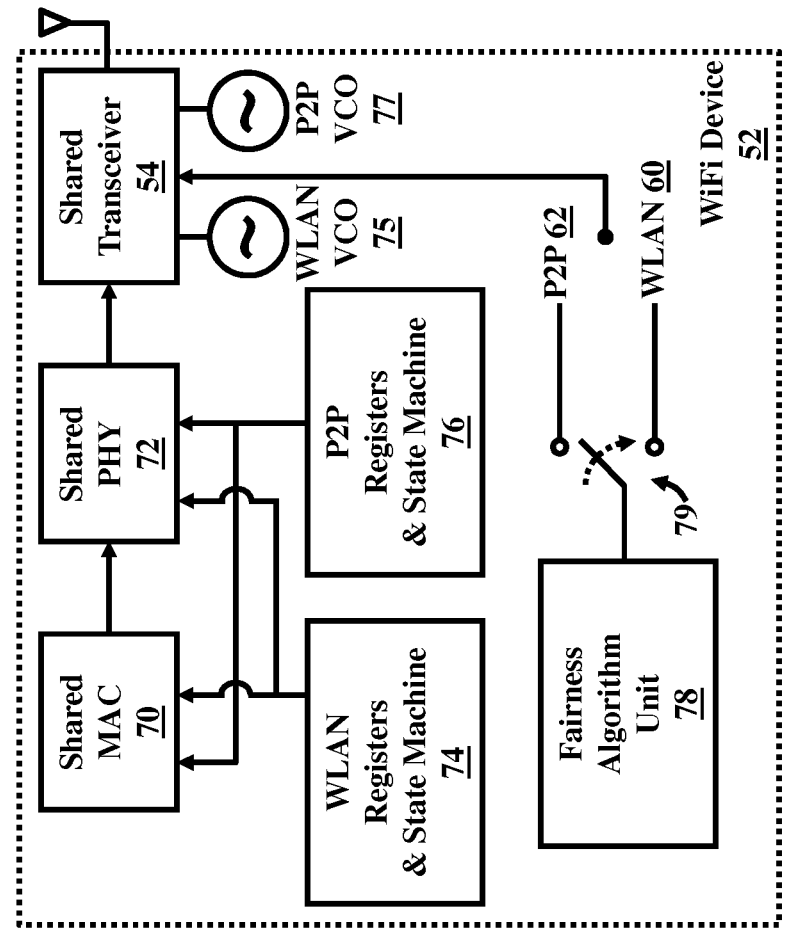

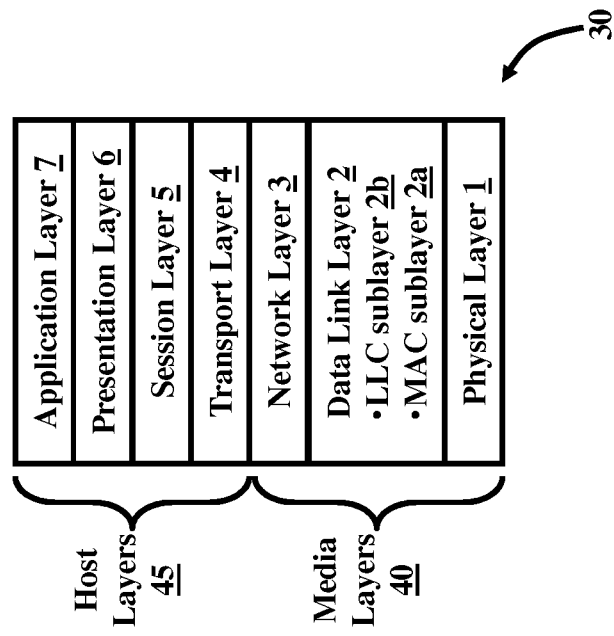

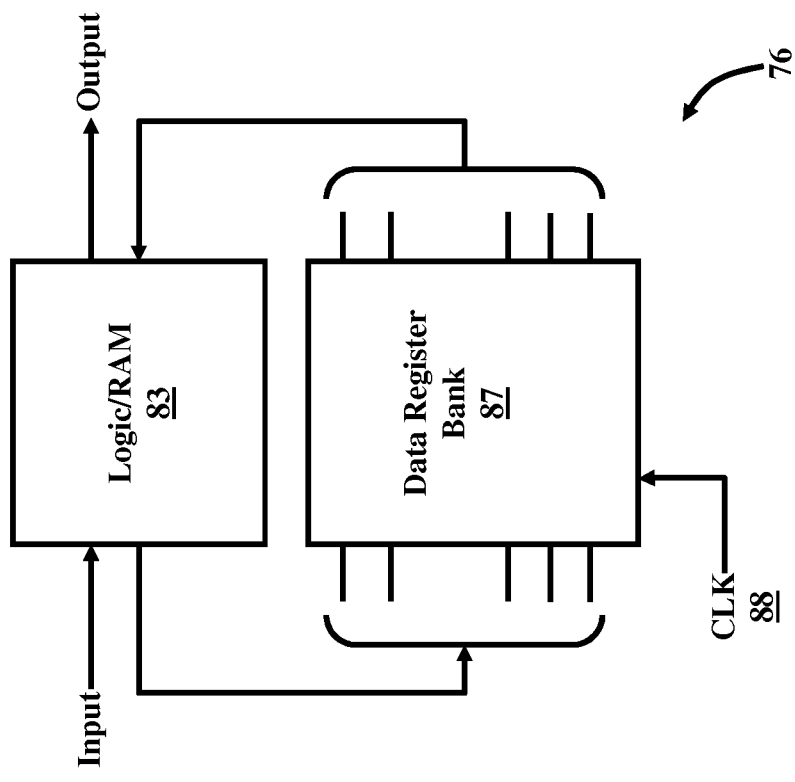
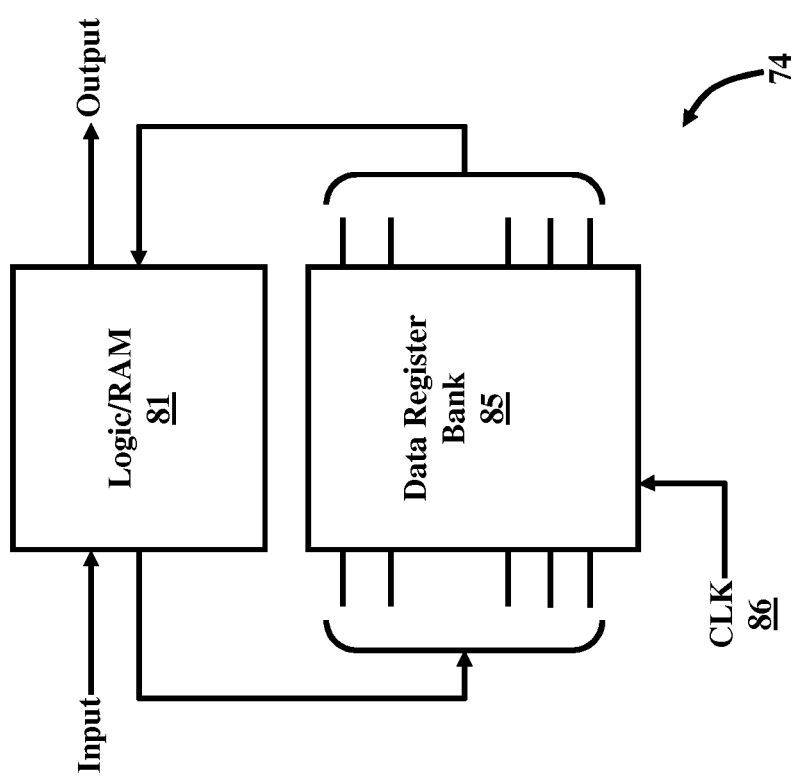

SINGLE TRANSCEIVER FOR WIRELESS PEER-TO-PEER CONNECTIONS

CROSS-REFERENCE TO RELATED APPLICATIONS

This application claims priority to U.S. Provisional Application Ser. No. 61/652,686 filed on May 29, 2012, the complete disclosure of which, in its entirety, is herein incorporated by reference.

BACKGROUND

1. Technical Field

The embodiments herein generally relate to wireless technologies, and, more particularly, to wireless local area network (WLAN), WiFi, and Peer-to-Peer (P2P) technologies.

2. Description of the Related Art

WiFi chipsets require supporting multiple instances of WiFi connections: WLAN and WiFi P2P. However, such requirements typically result in increased cost and chip die size. Accordingly, it is desirable to develop a solution that supports this requirement at a cost savings and reduction in chip die size.

SUMMARY

In view of the foregoing, an embodiment herein provides a system for performing data transfer in a communications network, the system comprising a first communication device comprising a transceiver; and an interface operatively connected to the first communication device, wherein the interface provides multiple operative connections for data transfer, wherein the multiple operative connections comprise a WLAN connection adapted for communication with an access point that generates data exchange signals; and a P2P connection adapted for communication with a second communication device, wherein the transceiver is shared between the multiple operative connections. The first communication device may comprise a WiFi device, and the second communication device may comprise a WiFi device. The first communication device may further comprise a pair of data registers and state machines; a media access control (MAC) layer controller that receives input from the pair of data registers and state machines; and a physical (PHY) layer controller that receives input from the pair of data registers and state machines and the MAC layer controller, and sends instructions to the transceiver.

The system may further comprise a voltage-controlled oscillator (VCO) that generates carrier frequencies, selectively switches between a WLAN carrier frequency and a P2P carrier frequency, and inputs the selected carrier frequency to the transceiver. Alternatively, the system may further comprise a pair of VCOs that provide for switching of selected carrier frequencies to the transceiver, wherein the pair of VCOs comprises a first VCO that generates a WLAN carrier frequency; and a second VCO that generates a P2P carrier frequency, wherein the WLAN carrier frequency and the P2P carrier frequency are selectively input into the transceiver based on a switching criteria. The system may further comprise a fairness algorithm unit that defines the switching criteria between the WLAN and P2P connections, wherein the switching criteria may comprise instructions for prioritizing multiplexed traffic between the WLAN and P2P connections. The pair of data registers and state machines may comprise a first data register bank associated with the WLAN connection; and a second data register bank associated with the P2P connection, wherein the first data register bank and the second data register bank store control registers. Moreover, the pair of data registers and state machines may comprise a first state machine associated with the WLAN connection; and a second state machine associated with the P2P connection, wherein the first state machine and the second state machine share a MAC layer and a PHY layer in the communications network. Additionally, the access point may comprise a WiFi access point.

Another aspect of the embodiments herein provides a method of performing data transfer in a communications network, the method comprising providing a first communication device comprising a transceiver; providing multiple operative connections for data transfer with the first communication device; associating a WLAN connection for communication with an access point that generates data exchange signals; associating a P2P connection for communication with a second communication device; and sharing the transceiver between the multiple operative connections. The first communication device may comprise a WiFi device, and the second communication device may comprise a WiFi device. The first communication device may further comprise a pair of data registers and state machines; a MAC layer controller that receives input from the pair of data registers and state machines; and a PHY layer controller that receives input from the pair of data registers and state machines and the MAC layer controller, and sends instructions to the transceiver.

The method may further comprise generating carrier frequencies using a VCO; selectively switching between a WLAN carrier frequency and a P2P carrier frequency using the VCO; and inputting the selected carrier frequency to the transceiver. The method may further comprise switching of selected carrier frequencies to the transceiver using a pair of VCOs, wherein the pair of VCOs comprises a first VCO that generates a WLAN carrier frequency, and a second VCO that generates a P2P carrier frequency; and selectively inputting the WLAN carrier frequency and the P2P carrier frequency input into the transceiver based on a switching criteria. The method may further comprise using a fairness algorithm unit that defines the switching criteria between the WLAN and P2P connections, wherein the switching criteria comprises instructions for prioritizing multiplexed traffic between the WLAN and P2P connections. The pair of data registers and state machines may comprise a first data register bank associated with the WLAN connection; and a second data register bank associated with the P2P connection, wherein the first data register bank and the second data register bank store control registers. Also, the pair of data registers and state machines may comprise a first state machine associated with the WLAN connection; and a second state machine associated with the P2P connection, wherein the first state machine and the second state machine share a MAC layer and a PHY layer in the communications network. Additionally, the access point may comprise a WiFi access point.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1 illustrates a system diagram of a communications network according to an embodiment herein;

FIG. 2A illustrates a block diagram of a WiFi device according to an embodiment herein;

FIG. 3 illustrates the Open Systems Interconnection (OSI) model used in accordance with the embodiments herein;

FIGS. 4A and 4B illustrate block diagrams of the registers and state machines of FIGS. 2A and 2B according to an embodiment herein;

DETAILED DESCRIPTION OF PREFERRED EMBODIMENTS

Figure 2B:
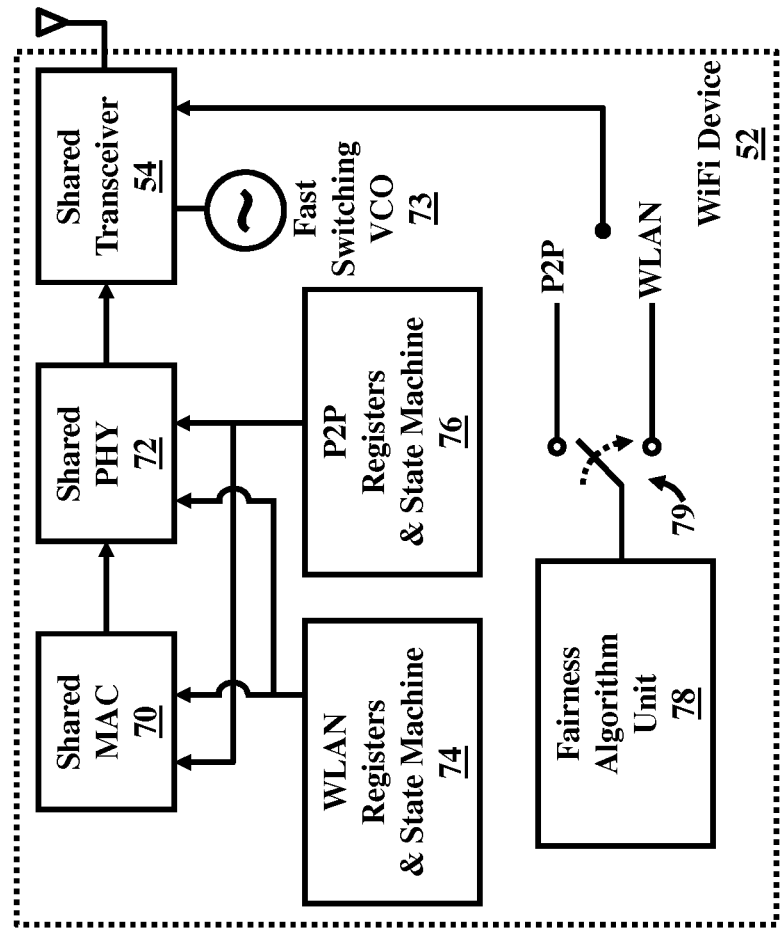
FIG. 2B illustrates another block diagram of a WiFi device according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a single transceiver for wireless P2P connections, thereby supporting multiple instances of WiFi connections; namely WLAN and WiFi, at a cost savings and reduction in chip die size. Referring now to the drawings, and more particularly to FIGS. 1 through 7, where similar reference characters denote corresponding features consistently throughout the figures, there are shown preferred embodiments.

Generally, as shown in FIGS. 1 through 4B, the embodiments herein use/share a single WiFi transceiver 54 and time multiplexed traffic between different WiFi WLAN and P2P connections 60, 62. The embodiments herein use multiple voltage-controlled oscillators (VCOs) 75, 77 for fast switching of carrier frequencies or use a fast switching VCO 73. The embodiments herein use multiple register banks 85, 87 to store control registers. The embodiments herein use multiple state machines 74, 76 and share PHY/MAC controllers 70, 72. The embodiments herein use a fairness algorithm to prioritize traffic between multiple connections 60, 62.

FIG. 1 illustrates a system diagram of a communications network 50 according to an embodiment herein. A WiFi device 52 comprising a single shared transceiver 54 is provided for different connections 60, 62 within the network 50. The WiFi device 52 may be configured as a smartphone, handset, tablet, computer, television, or other user equipment (UE), etc. A WLAN connection 60 is provided and maintained between the WiFi device 52 and a WiFi access point 58, which may be configured as a router. A separate P2P connection 62 is provided and maintained between the WiFi device 52 and a second WiFi device 56, which may be configured as a smartphone, handset, tablet, computer, television, or other UE, etc. The shared transceiver 54 permits data transfer with the WLAN connection 60 and the P2P connection 62. The connections 60, 62 may be facilitated using a suitably configured interface 55 such as an antenna, port, etc., and may be hardware and/or software enabled or a combination thereof.

FIG. 2A illustrates a block diagram of the WiFi device 52 of FIG. 1 according to an embodiment herein. As shown, the WiFi device 52 comprises various components that facilitate the sharing of the data transfer resources through the shared transceiver 54. As indicated in FIG. 2A, the WiFi device 52 comprises a WLAN registers and state machine 74 and a P2P registers and state machine 76, which provide data to the shared media access control (MAC) layer controller 70 and physical (PHY) layer controller 72. In other words, the MAC layer controller 70 and PHY layer controller 72 are also shared with the WLAN connection 60 and the P2P connection 62 (of FIG. 1). The MAC controller 70 implements the MAC sublayer 2a of the Open Systems Interconnection (OSI) model 30 shown in FIG. 3. Generally, the OSI model 30 provides data transfer protocols for the media layers and the host layers 45. The media layers 40 include the physical (PHY) layer 1, the data link layer 2, and the network layer 3. The data link layer 2 comprises the MAC sublayer 2a and the logical link control (LLC) sublayer 2b The host layers 45 include the transport layer 4, the session layer 5, the presentation layer 6, and the application layer 7.

Again with reference to FIG. 2A, a WLAN VCO 75 and P2P VCO 77 provide fast switching of WLAN and P2P carrier frequencies, respectively, for the transceiver 54. A fairness algorithm unit 78 processes a fairness algorithm, which manages the dataflow rules and parameters in the network 50 with respect to the shared transceiver 54. The fairness algorithm processed by the fairness algorithm unit 78 prioritizes the time multiplex traffic between multiple connections (e.g., WLAN connection 60 and the P2P connection 62). The fairness algorithm 78 activates a switching mechanism 79 (e.g., which could be embodied as a multiplexer, etc.) to facilitate selective switching between the WLAN connection 60 and the P2P connection 62.

FIG. 2B illustrates another block diagram of the WiFi device 52 of FIG. 1 according to an embodiment herein. The difference between FIG. 2A and FIG. 2B is that instead of multiple VCOs 75, 77 (of FIG. 2A), the WiFi device 52 is configured with only one fast switching VCO 73 in FIG. 2B. The advantage in FIG. 2B is a further reduction in components, which helps save space on the die for other components or reduce die size all together. The fast switching VCO 73 can selectively switch between generating WLAN and P2P carrier frequencies.

FIGS. 4A and 4B illustrate block diagrams of the registers and state machines 74, 76 of FIGS. 2A and 2B according to an embodiment herein. FIG. 4A illustrates the WLAN registers and state machine 74 and FIG. 4B illustrates the P2P registers and state machine 76. A logic or random access memory (RAM) unit 81 receives input from the data register bank 85 about the present state of the machine 74 along with other inputs, and produces the next state of the machine 74, which is fed back into the data register bank 85. Moreover, the logic or RAM unit 81 produces other outputs. The machine 74 transitions from the present state to the next state with every clock input (CLK) pulse 86. Similarly, a logic or RAM unit 83 receives input from the data register bank 87 about the present state of the machine 76 along with other inputs, and produces the next state of the machine 76, which is fed back into the data register bank 87. Moreover, the logic or RAM unit 83 produces other outputs. The machine 76 transitions from the present state to the next state with every clock input (CLK) pulse 88. The outputs of the machines 74, 76 are sent to the MAC layer controller 70 and PHY layer controller 72, as indicated above with respect to FIGS. 2A and 2B.

Figure 5:
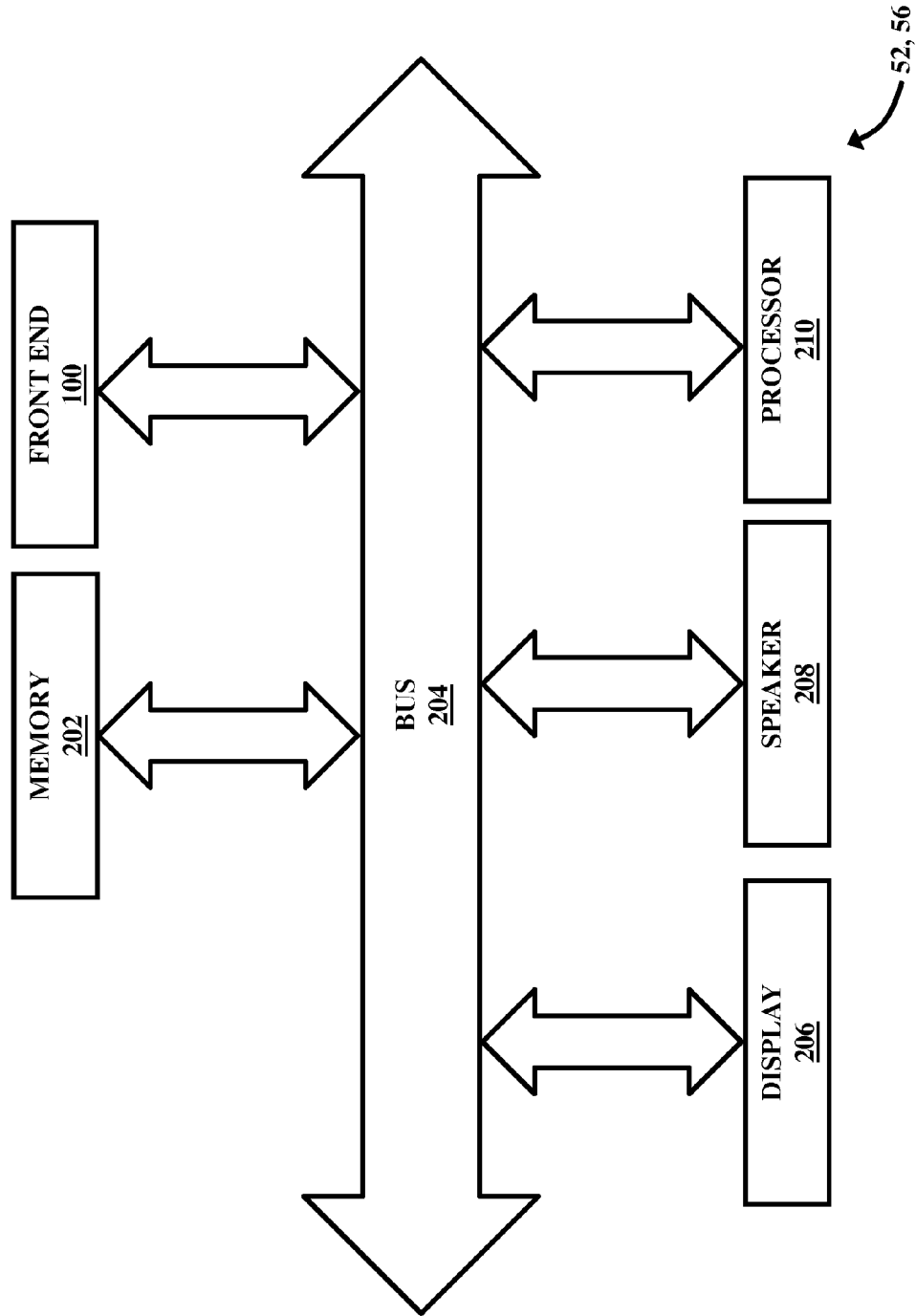
FIG. 5 illustrates still another block diagram of a WiFi device according to an embodiment herein.

FIG. 5, with reference to FIGS. 1 through 4B, illustrates an exploded view of the WiFi device 52, 56 having a memory 202 comprising a computer set of instructions. The WiFi device 52, 56 further includes a bus 204, a display 206, a speaker 208, and a processor 210 capable of processing a set of instructions to perform any one or more of the methodologies herein, according to an embodiment herein. The processor 210 may also enable analog content to be consumed in the form of output via one or more displays 206 or audio for output via speaker and/or earphones 208. The processor 210 may also carry out the methods described herein and in accordance with the embodiments herein. The content may also be stored in the memory 202 for future processing or consumption. A user of the WiFi device 52, 56 may view this stored information on display 206. When the content is selected, the processor 210 may pass information. The content may be passed among functions within the WiFi device 52, 56 using bus 204. The WiFi device 52, 56 may be operatively connected to a front end 100 for communication within a wireless communication network 50 (of FIG. 6).

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can include both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
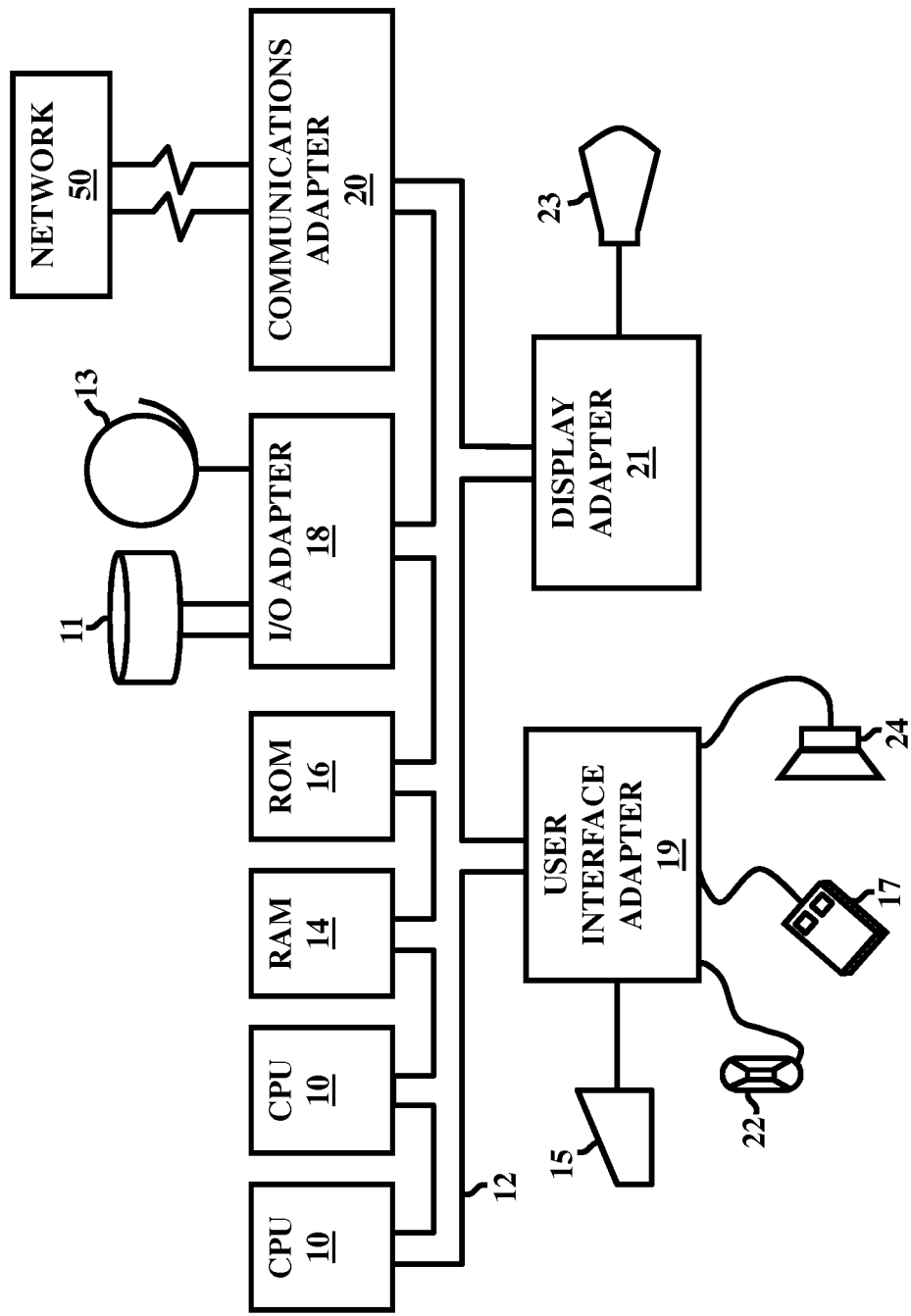
FIG. 6 illustrates a block diagram of a computer system according to an embodiment herein.

A representative hardware environment for practicing the embodiments herein is depicted in FIG. 6, with reference to FIGS. 1 through 5. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a RAM 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 50 (e.g., wireless communication network, in one example), and a display adapter 21 connects the bus 12 to a display device 23 which may be embodied as an output device such as a monitor, printer, or transmitter, for example.

Figure 7:
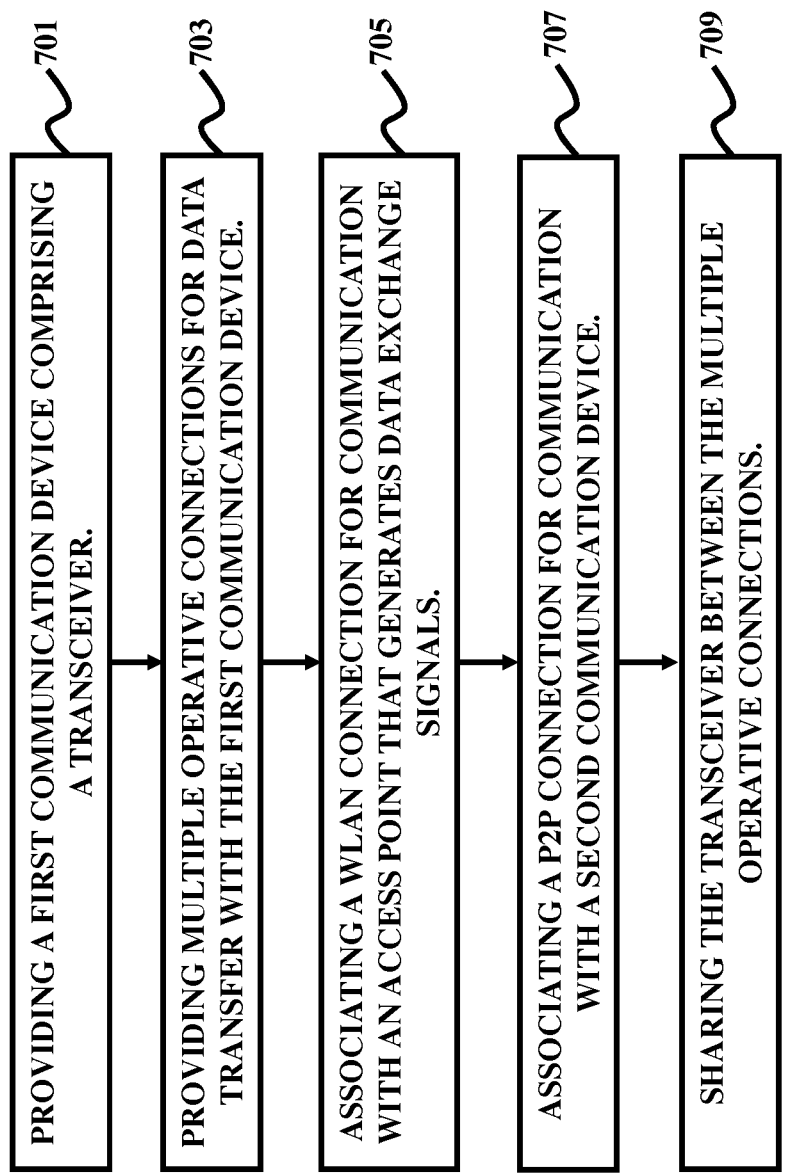
FIG. 7 is a flow diagram illustrating a method according to an embodiment herein.

FIG. 7, with reference to FIGS. 1 through 6, is a flow diagram illustrating a method of performing data transfer using P2P connections 62 in a communications network 50 according to an embodiment herein. The method comprises providing (701) a first communication device 52 comprising a transceiver 54; providing (703) multiple operative connections 60, 62 for data transfer with the first communication device 52; associating (705) a WLAN connection 60 for communication with an access point 58 that generates data exchange signals; associating (707) a P2P connection 62 for communication with a second communication device 56; and sharing (709) the transceiver 54 between the multiple operative connections 60, 62. The first communication device 52 may comprise a WiFi device, and the second communication device 56 may comprise a WiFi device. The first communication device 52 may further comprise a pair of data registers and state machines 74, 76; a MAC layer controller 70 that receives input from the pair of data registers and state machines 74, 76; and a PHY layer controller 72 that receives input from the pair of data registers and state machines 74, 76 and the MAC layer controller 70, and sends instructions to the transceiver 54.

The method may further comprise generating carrier frequencies using a VCO 73; selectively switching between a WLAN carrier frequency and a P2P carrier frequency using the VCO 73; and inputting the selected carrier frequency to the transceiver 54. The method may further comprise switching of selected carrier frequencies to the transceiver using a pair of VCOs 75, 77, wherein the pair of VCOs 75, 77 comprises a first VCO 75 that generates a WLAN carrier frequency, and a second VCO 77 that generates a P2P carrier frequency; and selectively inputting the WLAN carrier frequency and the P2P carrier frequency input into the transceiver 54 based on a switching criteria. The method may further comprise using a fairness algorithm unit 78 that defines the switching criteria between the WLAN and P2P connections 60, 62, wherein the switching criteria comprises instructions for prioritizing multiplexed traffic between the WLAN and P2P connections 60, 62. The pair of data registers and state machines 74, 76 may comprise a first data register bank 85 associated with the WLAN connection 60; and a second data register bank 87 associated with the P2P connection 62, wherein the first data register bank 85 and the second data register bank 87 store control registers. Also, the pair of data registers and state machines 74, 76 may comprise a first state machine (e.g., logic/RAM 81 and data register bank 85) associated with the WLAN connection 60; and a second state machine (e.g., logic/RAM 83 and data register bank 87) associated with the P2P connection 62, wherein the first state machine (e.g., logic/RAM 81 and data register bank 85) and the second state machine (e.g., logic/RAM 83 and data register bank 87) share a MAC layer 2*a* and a PHY layer 1 in the communications network 50. Additionally, the access point 58 may comprise a WiFi access point.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for performing data transfer in a communications network, said system comprising:
    a first communication device comprising:
        a transceiver;
        a pair of data registers and state machines;
        a media access control (MAC) layer controller that receives input from said pair of data registers and state machines; and
        a physical (PHY) layer controller that receives input from said pair of data registers and state machines and said MAC layer controller, and sends instructions to said transceiver; and
    an interface operatively connected to said first communication device, wherein said interface provides multiple operative connections for data transfer, wherein said multiple operative connections comprise:
        a wireless local area network (WLAN) connection adapted for communication with an access point that generates data exchange signals; and
        a peer-to-peer (P2P) connection adapted for communication with a second communication device,
    wherein said transceiver is shared between said multiple operative connections.

2. The system of claim 1, wherein said first communication device comprises a WiFi device, and wherein said second communication device comprises a WiFi device.

3. The system of claim 1, further comprising a voltage-controlled oscillator (VCO) that generates carrier frequencies, selectively switches between a WLAN carrier frequency and a P2P carrier frequency, and inputs the selected carrier frequency to said transceiver.

4. The system of claim 1, further comprising a pair of voltage-controlled oscillator (VCOs) that provide for switching of selected carrier frequencies to said transceiver, wherein said pair of VCOs comprises:
    a first VCO that generates a WLAN carrier frequency; and
    a second VCO that generates a P2P carrier frequency,
    wherein said WLAN carrier frequency and said P2P carrier frequency are selectively input into said transceiver based on a switching criteria.

5. The system of claim 4, further comprising a fairness algorithm unit that defines said switching criteria between the WLAN and P2P connections.

6. The system of claim 5, wherein said switching criteria comprises instructions for prioritizing multiplexed traffic between said WLAN and P2P connections.

7. The system of claim 1, wherein said pair of data registers and state machines comprises:
    a first data register bank associated with said WLAN connection; and
    a second data register bank associated with said P2P connection,
    wherein said first data register bank and said second data register bank store control registers.

8. The system of claim 1, wherein said pair of data registers and state machines comprises:
    a first state machine associated with said WLAN connection; and
    a second state machine associated with said P2P connection,
    wherein said first state machine and said second state machine share a MAC layer and a PHY layer in said communications network.

9. The system of claim 1, wherein said access point comprises a WiFi access point.

10. A method of performing data transfer in a communications network, said method comprising:
    providing a first communication device comprising:
        a transceiver;
        a pair of data registers and state machines;
        a media access control (MAC) layer controller that receives input from said pair of data registers and state machines; and
        a physical (PHY) layer controller that receives input from said pair of data registers and state machines and said MAC layer controller, and sends instructions to said transceiver;
    providing multiple operative connections for data transfer with said first communication device;

associating a wireless local area network (WLAN) connection for communication with an access point that generates data exchange signals;

associating a peer-to-peer (P2P) connection for communication with a second communication device; and sharing said transceiver between said multiple operative connections.

11. The method of claim 10, wherein said first communication device comprises a WiFi device, and wherein said second communication device comprises a WiFi device.

12. The method of claim 10, further comprising:

generating carrier frequencies using a voltage-controlled oscillator (VCO);

selectively switching between a WLAN carrier frequency and a P2P carrier frequency using said VCO; and inputting the selected carrier frequency to said transceiver.

13. The method of claim 10, further comprising:

switching of selected carrier frequencies to said transceiver using a pair of voltage-controlled oscillator (VCOs), wherein said pair of VCOs comprises a first VCO that generates a WLAN carrier frequency, and a second VCO that generates a P2P carrier frequency; and selectively inputting said WLAN carrier frequency and said P2P carrier frequency input into said transceiver based on a switching criteria.

14. The method of claim 13, further comprising using a fairness algorithm unit that defines said switching criteria between the WLAN and P2P connections.

15. The method of claim 14, wherein said switching criteria comprises instructions for prioritizing multiplexed traffic between said WLAN and P2P connections.

16. The method of claim 10, wherein said pair of data registers and state machines comprises:

a first data register bank associated with said WLAN connection; and a second data register bank associated with said P2P connection, wherein said first data register bank and said second data register bank store control registers.

17. The method of claim 10, wherein said pair of data registers and state machines comprises:

a first state machine associated with said WLAN connection; and a second state machine associated with said P2P connection, wherein said first state machine and said second state machine share a MAC layer and a PHY layer in said communications network.

18. The method of claim 10, wherein said access point comprises a WiFi access point.

19. A system for performing data transfer comprising:

an interface that provides multiple operative connections for data transfer, wherein said multiple operative connections comprise a wireless local area network (WLAN) connection adapted for communication with an access point that generates data exchange signals, and a peer-to-peer (P2P) connection adapted for communication with a communication device, a transceiver that is shared between said multiple operative connections; and a plurality of voltage-controlled oscillator (VCOs) that provide for switching of selected carrier frequencies to said transceiver, wherein said plurality of VCOs comprises a first VCO that generates a WLAN carrier frequency, and a second VCO that generates a P2P carrier frequency, wherein said WLAN carrier frequency and said P2P carrier frequency are selectively input into said transceiver based on a switching criteria.

20. The system of claim 19, further comprising a fairness algorithm unit that defines said switching criteria between the WLAN and P2P connections, wherein said switching criteria comprises instructions for prioritizing multiplexed traffic between said WLAN and P2P connections.

* * * * *